(12) United States Patent
Marion et al.

(10) Patent No.: US 8,940,802 B2
(45) Date of Patent: Jan. 27, 2015

(54) METHOD FOR OPTIMIZING THE OPERATION OF A HYDROCARBON SYNTHESIS UNIT STARTING FROM SYNTHESIS GAS, BY CONTROLLING THE PARTIAL PRESSURE OF CO

(75) Inventors: Marie Claire Marion, Vernaison (FR); Andrea Tasso, Zelo Buon Persico (IT); Ugo Cornaro, Seriate (IT)

(73) Assignees: ENI S.p.A., Rome (IT); IFP Energies Nouvelles, Rueil-Malmaison Cedex (FR)

( * ) Notice: Subject to any disclaimer, the term of this patent is extended or adjusted under 35 U.S.C. 154(b) by 356 days.

(21) Appl. No.: 13/377,193

(22) PCT Filed: May 18, 2010

(86) PCT No.: PCT/FR2010/000378
§ 371 (c)(1),
(2), (4) Date: Feb. 1, 2012

(87) PCT Pub. No.: WO2010/142863
PCT Pub. Date: Dec. 16, 2010

(65) Prior Publication Data
US 2012/0129961 A1    May 24, 2012

(30) Foreign Application Priority Data

Jun. 10, 2009  (FR) ...................... 09 02801

(51) Int. Cl.
| | | |
|---|---|---|
| *C07C 1/04* | (2006.01) | |
| *C10G 2/00* | (2006.01) | |
| *B01J 23/75* | (2006.01) | |

(52) U.S. Cl.
CPC .................. *C10G 2/332* (2013.01); *B01J 23/75* (2013.01); *C10G 2300/802* (2013.01)
USPC .......................................................... 518/715

(58) Field of Classification Search
None
See application file for complete search history.

(56) References Cited

U.S. PATENT DOCUMENTS

| | | | |
|---|---|---|---|
| 6,455,462 B2 | 9/2002 | van Berge et al. | |
| 8,399,526 B2 * | 3/2013 | Marion et al. | ................ 518/715 |
| 2005/0027020 A1 | 2/2005 | Steynberg | |
| 2007/0004810 A1 * | 1/2007 | Wang et al. | .................. 518/718 |
| 2008/0200569 A1 | 8/2008 | Marion et al. | |

FOREIGN PATENT DOCUMENTS

| | | | | |
|---|---|---|---|---|
| FI | WO2008/065268 | * | 6/2008 | ................ C07C 1/04 |
| WO | WO 03/068715 A1 | | 8/2003 | |
| WO | WO 2005/123882 A1 | | 12/2005 | |
| WO | WO 2008/065268 A1 | | 6/2008 | |

OTHER PUBLICATIONS

Machine translation of WO2008/065268.*
International Search Report of PCT/FR2010/000378 (Aug. 18, 2010).

* cited by examiner

*Primary Examiner* — Jafar Parsa
*Assistant Examiner* — Amy C Bonaparte
(74) *Attorney, Agent, or Firm* — Millen, White, Zelano & Branigan, P.C.

(57) ABSTRACT

A method is described for optimizing the operation of a reaction section for the synthesis of hydrocarbons from a feed comprising synthesis gas, operated in the presence of a catalyst comprising cobalt, said method comprising the following steps:
a) determining the theoretical partial pressure of CO in the reaction section;
b) optionally, adjusting the partial pressure of CO determined in step a) to a value of 4 bar or higher;
c) determining a new value for the theoretical partial pressure of CO in the reaction section.

13 Claims, No Drawings

METHOD FOR OPTIMIZING THE OPERATION OF A HYDROCARBON SYNTHESIS UNIT STARTING FROM SYNTHESIS GAS, BY CONTROLLING THE PARTIAL PRESSURE OF CO

The present invention relates to the field of the synthesis of hydrocarbons from a mixture comprising carbon monoxide (CO), hydrogen ($H_2$) and possibly carbon dioxide ($CO_2$), generally known as synthesis gas.

The method of the invention means that the operation of a unit for synthesizing hydrocarbons starting from synthesis gas, this synthesis also being known as Fischer-Tropsch synthesis, can be optimized.

The method of the invention is a method for controlling the Fischer-Tropsch synthesis in which the partial pressure of carbon monoxide, optionally associated with the ratio of the partial pressures of water and hydrogen, $P_{H2O}$:$P_{H2}$, and/or with the partial pressure of water in the reaction section, is(are) used as control parameter(s) for said Fischer-Tropsch synthesis.

PRIOR ART

The reaction for converting synthesis gas (CO—$CO_2$—$H_2$) mixture) into hydrocarbons has been known since the beginning of the twentieth century and is generally known as the Fischer-Tropsch synthesis. Units were operated in Germany during the Second World War, then in South Africa to synthesize synthetic fuels. Depending on the origin of the synthesis gas (coal, natural gas) and/or on the desired products, catalysts based on iron or cobalt are used.

More recently, fresh interest in such syntheses has arisen, more particularly as regards the use of catalysts comprising cobalt which can orientate the reaction towards the formation of heavier hydrocarbons, principally paraffins, essentially C5+ hydrocarbons (hydrocarbons containing 5 or more carbon atoms per molecule), while minimizing the formation of methane and hydrocarbons containing 2 to 4 carbon atoms per molecule ($C_2$-$C_4$). The hydrocarbons formed thereby may be transformed in a downstream hydrocracking unit in order to produce mainly kerosene and gas oil. Such a process is, for example, described in patent EP-B-1 406 988. The use of a catalyst comprising cobalt is more suited than catalysts comprising iron for the treatment of synthesis gas (feed) which is rich in hydrogen ($H_2$/CO of the order of 2), derived in particular from the transformation of natural gas.

Many cobalt-based formulations have been described in the prior art. Patent applications EP-A-0 313 375 or EP-A-1 233 011 describe specific Fischer-Tropsch catalysts: patent application EP-A-0 313 375 describes a catalyst for the conversion of synthesis gas into hydrocarbons comprising catalytically active quantities of cobalt and relatively small quantities of rhenium combined on an alumina support; EP-A-1 233 011 describes a catalyst used in a process for synthesizing hydrocarbons from a mixture comprising CO and $H_2$, said catalyst comprising at least one metal from group VIII supported on a silica-alumina prepared by co-precipitation and calcined at a temperature in the range 500° C. to 1200° C. for at least 6 hours so that said silica-alumina has a specific surface area of less than 260 $m^2$/g. In contrast to catalysts based on iron which are active in the reaction for converting CO into $CO_2$ (water gas shift reaction, WGSR) which is written as follows: $CO+H_2O \rightarrow CO_2+H_2$, cobalt-based catalysts have only low activity in this reaction (B H Davies, Catalysis Today, 84, 2003, p 83).

Before the phase for functioning/operating the Fischer-Tropsch synthesis proper, Fischer-Tropsch catalysts containing cobalt, generally pre-reduced, undergo an ultimate phase of transformation during their first use in the presence of synthesis gas. Thus, a cobalt-containing Fischer-Tropsch catalyst terminates its "construction" in situ, in synthesis gas, during a phase termed the startup phase of the Fischer-Tropsch unit. This "end of construction" phase for the Fischer-Tropsch catalyst during the startup phase is carried out by chemisorption of reactive species, in particular by chemisorption of CO present in the synthesis gas, onto cobalt catalytic sites (H Schultz et al, Catal Today 71, 2002, 351-360). The startup phase is carried out under controlled conditions in order to allow the catalyst to be finished and not to damage it. Patent application WO-03/068715 discloses the use of a procedure for startup of a Fischer-Tropsch process prior to the function/operation phase of the Fischer-Tropsch reactor.

The efficiency of a Fischer-Tropsch process depends fundamentally on the overall performance characteristics of the catalyst used to carry out the Fischer-Tropsch synthesis, namely the activity and selectivity of said catalyst which determine its productivity for heavy products generally desired to maximize the yield of high quality diesel fuel, and the stability of said catalyst which determines the makeup of catalyst or the frequency at which the catalyst is replaced, i.e. the catalyst cost of the process.

The contribution by the catalyst cost to the Fischer-Tropsch synthesis process to the overall costs of the process is not negligible (see Catal Today, A Brumby et al, Catal Today, vol 106, 2005, 166-169). As a result, any improvement to the service life of the catalyst, a function of the stability of the catalyst, is vital.

The stability of the Fischer-Tropsch catalyst depends on both its intrinsic properties (support characteristics, mode of preparation) and the conditions under which it is used. Thus, U.S. Pat. No. 6,262,132 and patent applications WO-99/42214 and WO-03/012008 describe the use of improved catalysts, which are more resistant to wear or to the loss of active phase. These improvements are supplied by using a stabilized support or promoter. Furthermore, it is known that the Fischer-Tropsch synthesis conditions are severe and may give rise to rather high water partial pressure conditions: these conditions may then result in deactivation of the Fischer-Tropsch catalyst by oxidation of metallic cobalt (active phase), especially when said catalyst is cobalt-based (see P J van Berge et al, Catal Today 58, 321-334, 2000, A M Hilmen et al, Appl Catal 186, 169-188, 1999).

Further, the risks of deactivation of the Fischer-Tropsch catalyst and the non-negligible part played by the catalyst cost in carrying out the method have led to research into improving catalyst performance, especially an improvement in the stability of the catalyst with a view to increasing the service life of the catalyst.

SUMMARY OF THE INVENTION

The method of the invention is a method for optimizing the function of a unit for synthesizing hydrocarbons starting from a feed comprising synthesis gas, operated in the presence of at least one catalyst comprising cobalt.

The method of the invention is applicable to a process for synthesizing hydrocarbons from a feed comprising synthesis gas, operated with at least one catalyst comprising cobalt. Said method comprises the following steps: determining the theoretical partial pressure of carbon monoxide CO in the reaction section followed by optional adjustment of said pressure then determining a new value for the partial pressure of CO to ensure that it has reached a value of 4 bar or higher (1 bar=0.1 MPa), preferably 4.5 bar or higher and more preferably 4.8 bar or higher.

Said method of the invention also preferably comprises controlling the ratio $P_{H2O}:P_{H2}$ in the reaction section and/or controlling the partial pressure of water in the Fischer-Tropsch synthesis reaction section. More preferably, the method of the invention is carried out under conditions such that the partial pressure of carbon monoxide is 4 bar or higher in the reaction section, the ratio $P_{H2O}:P_{H2}$ has a value of 0.8 or lower and the partial pressure of water is kept above a critical value $PpH_2O_{limit}$ defined below in the present description and dependent on the mean pore diameter of the Fischer-Tropsch catalyst, the temperature of the reaction section and the pressure of the saturated water vapour at the reaction temperature.

The method for controlling the Fischer-Tropsch synthesis in accordance with the invention surprisingly results in a substantial improvement in the activity of the catalyst, and as a consequence in the stability of the catalyst, when the partial pressure of CO in the Fischer-Tropsch synthesis reaction section reaches a value of 4 bar or higher, preferably 4.5 bar or higher and more preferably 4.8 bar or higher. This results in a reduction in the frequency at which the catalyst in said reaction section is replaced and as a consequence in a reduction to the Fischer-Tropsch synthesis cost represented by the catalyst cost.

DETAILED DESCRIPTION OF THE INVENTION

The present invention concerns a method for optimizing the operation of a reaction section for the synthesis of hydrocarbons from a feed comprising synthesis gas, operated in the presence of at least one catalyst comprising cobalt, said method comprising the following steps:
a) determining the theoretical partial pressure of CO in the reaction section;
b) optionally, adjusting the partial pressure of CO determined in step a) to a value of 4 bar or higher using at least one means selected from the means described below;
c) determining a new value for the theoretical partial pressure of CO in the reaction section to ensure that it has reached a value or 4 bar or higher.

The method of the invention is a method for controlling and optimizing the Fischer-Tropsch synthesis in which the partial pressure of carbon monoxide in the Fischer-Tropsch synthesis reaction section is used as a parameter for control and optimization of this synthesis. The method of the invention allows the function of the Fischer-Tropsch synthesis reaction section to be improved by increasing the service life of the catalyst.

The present invention envisages the synthesis of a mixture of hydrocarbons preferably formed from long carbon chain compounds, i.e. hydrocarbon compounds containing more than 5 carbon atoms per molecule and preferably containing more than 20 carbon atoms per molecule, in the presence of at least one catalyst comprising cobalt. The hydrocarbons formed are mainly paraffins. This synthesis is carried out starting from synthesis gas comprising carbon monoxide and hydrogen and possibly carbon dioxide: it is the Fischer-Tropsch synthesis.

In accordance with the invention, the reaction section for carrying out the Fischer-Tropsch synthesis is provided with at least one catalyst comprising cobalt used either in fixed bed mode or in a three-phase reactor (slurry mode) or in a continuously stirred reactor. When used in fixed bed mode, said fixed bed is provided with one or more beds of catalyst. When used in a three-phase reactor, the catalyst is in suspension in an essentially inert liquid phase and in a reactive gas phase constituted by the feed (synthesis gasoline).

In accordance with the invention, the synthesis gas used to carry out the Fischer-Tropsch synthesis may be obtained via transformation of natural gas, coal or biomass using processes such as steam reforming or partial oxidation, or by methanol decomposition, or from any other process which is known to the skilled person. Any feed comprising at least hydrogen and carbon monoxide may thus be suitable. Preferably, the synthesis gas used in the Fischer-Tropsch synthesis has a $H_2$:CO molar ratio in the range 1:2 to 5:1, more preferably in the range 1.2:2 to 3:1 and still more preferably in the range 1.5:1 to 2.6:1. In addition to hydrogen and carbon monoxide, synthesis gas generally comprises a small proportion of carbon dioxide ($CO_2$), preferably less than 15% by volume, and more preferably less than 10% by volume.

Fischer-Tropsch synthesis is generally carried out at a total pressure in the range 0.1 MPa to 15 MPa, preferably in the range 1 MPa to 10 MPa and more preferably in the range 1.5 MPa to 5 MPa. The hourly space velocity of synthesis gas is generally in the range 100 to 40000 $h^{-1}$ (volume of synthesis gas per volume of catalyst per hour), preferably in the range 400 to 20000 $h^{-1}$.

In accordance with the invention, any catalyst comprising cobalt known to the skilled person is suitable for carrying out Fischer-Tropsch synthesis. In particular, the catalysts described in patent applications EP-A-1 233 011 and EP-A-0 313 375, mentioned in the "prior art" section of the present patent application, are suitable for carrying out Fischer-Tropsch synthesis. Preferably, catalysts comprising cobalt deposited on a support selected from the following oxides are used: alumina, silica, zirconia, titanium oxide, magnesium oxide or mixtures thereof. Preferably, said support is constituted by alumina. Various promoters which are known to the skilled person may also be added, in particular those selected from the following elements: rhenium, ruthenium, molybdenum, tungsten, chromium. It is also possible to add at least one alkali or alkaline-earth metal to these catalytic formulations.

According to the invention, the method for optimizing the function of a reaction section carrying out Fischer-Tropsch synthesis comprises at least the following control steps:
a) determining the theoretical partial pressure of CO in the reaction section;
b) optionally, adjusting the partial pressure of CO determined in step a) to a value of 4 bar or higher in the reaction section;
c) determining a new value for the theoretical partial pressure of CO in the reaction section to ensure that it reaches a value of 4 bar or higher.

The theoretical partial pressure of CO in said step a) of the method of the invention may be determined using any means known to the skilled person. In particular, the theoretical partial pressure of CO is determined, according to said step a), from the molar composition of the gas phase in the reaction section and from the total pressure in the reaction section. The theoretical partial pressure of CO is thus defined as follows:

$$Pp_{CO} = (x_{(CO)}/\Sigma x_i) * P_T,$$

where $x_{(CO)}$=molar fraction of CO in the gas phase in the reaction section;
$x_i$=molar fraction of gaseous compounds i in the gas phase in the reaction section ($\Sigma x_i = 1$);
$P_T$=total pressure (bar) in the reaction section. The molar fraction of gaseous compounds i is readily determined by gas chromatographic analysis. The gaseous compounds i are all the gaseous compounds present in the reaction section, in particular hydrogen and unconverted carbon monoxide and light products from the Fischer-Tropsch synthesis reaction.

The partial pressure of CO is a maximum at the reactor inlet, i.e. when the molar fraction of CO present in the feed is a maximum (zero conversion of CO).

The theoretical partial pressure of CO may also be determined by computation from databases for actual Fischer-Tropsch syntheses (especially the $H_2/CO$ ratio for the feed, the CO and $H_2$ content in the feed, the degree of CO conversion, the distribution of the products and the selectivity for $CO_2$) and from a flash computation (distribution of gas and liquid phase products), for example. The computation of the theoretical partial pressure of CO is simple for a skilled person having a complete material balance to hand.

The degree of conversion of carbon monoxide (Cv) is defined from quantitative measurements of the carbon monoxide which enters the reaction section for hydrocarbon synthesis (inlet CO) and of the carbon monoxide which leaves said reaction section (outlet CO). These measurements are generally carried out by gas chromatography using a catharometric detector. In the same manner, the hydrogen is quantitatively measured with a column and a specific detector in the gas streams entering and leaving the reaction section for hydrocarbon synthesis in order to calculate the various $H_2/CO$ ratios.

In accordance with the method of the invention, step b) consists, if necessary, of adjusting the partial pressure of CO determined in step a) to a value of 4 bar or higher in the reaction section. The partial pressure of CO is adjusted using at least one means selected from the following means:

1) increasing the total pressure in the Fischer-Tropsch synthesis reaction section;
2) increasing the concentration of CO in the feed using one and/or the other of the following means 2.1) and 2.2):
   2.1) reducing the inert compounds in the feed;
   2.2) reducing the $H_2/CO$ molar ratio in the feed;
3) reducing the degree of CO conversion.

It will be recalled that the partial pressure of a gaseous compound i is expressed as follows: $Pp(i)=X_i*P$ (or $Pp(i)=X_i/\Sigma X_i*P$, knowing that $\Sigma X_i=1$);
where $X_i$=the molar fraction of compound i in the gas phase in the reaction section; and
P is the total pressure in the reaction section.

It will also be recalled that the definition of the molar fraction of CO is as follows:

$$X(CO)=n(CO)/\Sigma n(i),$$

where i represents all gaseous compounds present in the reaction section, n(i) is the number of moles of compound i in the reaction section and n(CO) is the number of moles of CO in the reaction section.

According to the invention, adjustment of the partial pressure of CO by increasing the total pressure in the reaction section induces, in the same proportions, an increase in the partial pressure of each of the gaseous compounds present in the reaction section, in particular an increase in the partial pressure of CO.

Adjusting the partial pressure of CO by increasing the concentration of CO in the feed also corresponds to an increase in the molar fraction of CO, from which results an increase in the partial pressure of CO. The molar fraction of CO may be increased:

2.i) by modifying the operating conditions of the synthesis gas production section located upstream of the Fischer-Tropsch reaction section to either reduce the quantity of other inert gaseous compounds in the feed constituted by synthesis gas (means 2.1 described above) or to increase the proportion of CO in the synthesis gas by reducing the $H_2/CO$ molar ratio of the synthesis gas (means 2.2 described above);

2.ii) by reducing the ratio for recycling the gaseous effluent from the reaction section and processed in one or more separation zones to the reactor inlet in the case of the presence of an internal recycle in a Fischer-Tropsch synthesis unit. Thus, the quantity of recycled inert compounds is reduced, and as a consequence the quantity of inert compounds in the feed at the inlet to the reaction section is reduced. However, this action will have an effect on the degree of CO conversion per pass of the reactor (increase in the degree of conversion per pass, i.e. an increase in the degree of conversion of CO measured between the inlet and outlet of the reaction section) which will then have a reverse effect on the concentration of CO. This mode of action is not preferred.

Adjustment of the partial pressure of CO by reducing the degree of conversion of CO can increase the quantity of residual CO in the reaction section and thus its partial pressure as a consequence. The reduction in the degree of conversion of CO is carried out using any means influencing the reaction kinetics. Non-limiting examples which may be cited are as follows:

a reduction in the reaction temperature (slowing down the reaction kinetics in accordance with Arrhenius' law);

an increase in the flow rate of the feed at the inlet to the reaction section (slowing down the reaction kinetics by reducing the reagent/catalyst contact time or the residence time for said reagents in the reaction section in contact with the catalyst).

Selecting one of these means essentially depends on the means available in the industrial unit, the operating conditions at the time of selection and the industrial constraints to be considered.

Highly preferably, adjustment of the partial pressure of CO in accordance with said step b) of the method of the invention is carried out by increasing the total pressure in the Fischer-Tropsch synthesis reaction section or by reducing the inert compounds in the feed in order to increase the concentration of CO in the feed.

In accordance with the optimization method of the invention, said step b) for adjusting the partial pressure of CO is followed by a step c) consisting of determining the new value for the theoretical partial pressure of CO in the reaction section in order to check that it is 4 bar or higher, preferably 4.5 bar or higher and more preferably 4.8 bar or higher.

In accordance with step c) of the method of the invention, the theoretical partial pressure of CO is determined in the same manner as the theoretical partial pressure of CO determined when carrying out step a) of the method of the invention.

According to the invention, a theoretical partial pressure of CO is sought in the reaction section at the end of step c) which is 4 bar or higher, preferably 4.5 bar or higher, and more preferably 4.8 bar or higher.

In accordance with a first preferred implementation of the optimization method of the invention, the essential parameter for control and optimization of the Fischer-Tropsch synthesis consisting of application of a minimum value for the partial pressure of CO in the reaction section is associated with a supplemental parameter for control and optimization of the Fischer-Tropsch synthesis consisting of operating in said reaction section under conditions such that the ratio of the partial pressures of $H_2O$ and $H_2$, denoted the $P_{H2O}:P_{H2}$ ratio, has a value of 0.8 or lower, preferably 0.75 or lower and more preferably 0.7 or lower. Said ratio $P_{H2O}:P_{H2}$ also corresponds to the molar ratio $H_2O/H_2$, which has a value of 0.8 or lower, preferably 0.75 or lower, and more preferably 0.7 or lower.

In accordance with said preferred first implementation of the optimization method of the invention, in addition to steps a) to c) described above, said method comprises the following control steps:

e) determining the theoretical molar ratio, $P_{H2O}{:}P_{H2}$, in the reaction section;

f) optionally, adjusting the ratio $P_{H2O}{:}P_{H2}$ determined in step e) to a value of 0.8 or lower;

g) determining the new value for the theoretical ratio $P_{H2O}{:}P_{H2}$ in the reaction section to check that said ratio has a value of 0.8 or lower.

In accordance with said first preferred implementation, the ratio $P_{H2O}{:}P_{H2}$ of step e) of the method of the invention may be determined using any means which is known to the skilled person. Step e) is preferably carried out using means selected from the means detailed below.

One preferred means for determining the theoretical ratio $P_{H2O}{:}P_{H2}$ in the reaction section according to said step e) consists of measuring the quantity of carbon monoxide in the gaseous effluent from the reaction section and evaluating the theoretical ratio, $P_{H2O}{:}P_{H2}$, from the degree of conversion of carbon monoxide in the whole of the reaction section comprising one or more reactors, the ratio $H_2{:}CO$ in the feed and the ratio $H_2{:}CO$ of the gas consumed by the reaction (also termed the use ratio).

The degree of conversion of carbon monoxide (Cv) is defined from quantitative measurements for the carbon monoxide which enters the reaction section for hydrocarbon synthesis (inlet CO) and the carbon monoxide which leaves said reaction section (outlet CO). These measurements are generally carried out by gas chromatography using a catharometric detector. In the same manner, the hydrogen is measured quantitatively with a specific column and detector in the gas streams entering and leaving the reaction section for hydrocarbon synthesis in order to calculate the various $H_2/CO$ ratios.

Thus, the degree of conversion of carbon monoxide (Cv), the ratio (or $H_2/CO$ quotient) of the feed (R1) and the use ratio (or $H_2/CO$ quotient) (Rft) are defined as follows:

$$Cv=(CO_{inlet}-CO_{outlet})/CO_{inlet}$$

$$R1=H_2/CO_{(feed)}=H_{2(inlet)}/CO_{(inlet)}(mol/mol)$$

$$Rft=H_2/CO_{(reaction)}=(H_{2(inlet)}-H_{2(outlet)})/(CO_{inlet}-CO_{outlet}).$$

Thus, the theoretical ratio $P_{H2O}{:}P_{H2}$ in the reaction section can be evaluated using the following computation:

$$\text{Theoretical } P_{H2O}{:}P_{H2}=Cv/(R1-(Rft\times Cv)).$$

The use ratio Rft to some extent qualifies the intrinsic selectivity of the Fischer-Tropsch synthesis catalyst.

In accordance with said first preferred implementation of the optimization method of the invention, step f) consists of adjusting, if necessary, the ratio $P_{H2O}{:}P_{H2}$ determined in said step e) to a value of 0.8 or lower. Adjustment of the ratio $P_{H2O}{:}P_{H2}$ is advantageously carried out using means selected from the following means:

4) increasing the feed flow rate;

5) in the case in which the reaction section or at least one reactor of the reaction section is equipped with a recycle for unconverted synthesis gas, increasing the recycle ratio;

6) continuously eliminating all or part of the water formed by the Fischer-Tropsch synthesis reaction;

7) modifying the ratio $H_2/CO$ at the inlet to the reaction section for hydrocarbon synthesis or at least one reactor of said section when there is a plurality;

8) reducing the operating temperature;

9) reducing the total pressure.

In more detail, this adjustment of the ratio $P_{H2O}{:}P_{H2}$ according to said step f) may be carried out using one of the following means:

4) Increasing the flow rate of fresh feed (synthesis gas) is one of the preferred means. It can reduce the contact time for the feed with the catalyst present in the reaction section, and thus reduce the degree of conversion of CO per pass, i.e. the degree of conversion of CO measured between the inlet and outlet of the reaction section, and as a consequence reduce the ratio $P_{H2O}{:}P_{H2}$. Further, this action has the advantage of increasing the productivity of the overall Fischer-Tropsch process.

5) Increasing the recycle ratio of unconverted synthesis gas, in the case in which the reaction section or at least one reactor of said section is equipped with an internal recycle, constitutes one of the preferred modes of action. It causes a reduction in the degree of conversion of CO per pass, i.e. the degree of conversion of CO measured between the inlet and outlet of the reaction section, and as a consequence a reduction in the $P_{H2O}{:}P_{H2}$ ratio in the reaction section.

6) Another method for adjusting the ratio $P_{H2O}{:}P_{H2}$ in accordance with said step f) consists of continuously eliminating all or part of the water formed by the Fischer-Tropsch synthesis reaction using a separation device installed in at least one Fischer-Tropsch synthesis reactor or in a recycle loop integrated into the Fischer-Tropsch synthesis process. Such separation may, for example, be carried out using a drum which can separate the aqueous phase and the organic phase in a recycle loop or using a membrane installed in said loop or in at least one synthesis reactor.

7) Another method for adjusting the ratio $P_{H2O}{:}P_{H2}$ in accordance with said step f) consists of modifying the $H_2/CO$ ratio at the inlet to the reaction section for hydrocarbon synthesis or of at least one reactor of said hydrocarbon synthesis section when there are several. The $H_2/CO$ ratio at the inlet is advantageously modified in accordance with at least one of the means i) to iv) explained below, which may be carried out independently or in combination:

i) this modification may be achieved by modifying the operating conditions of the synthesis gas production section located upstream of the Fischer-Tropsch reaction section, thus generating a modification of the $H_2/CO$ ratio at the outlet from this synthesis gas section;

ii) adding supplemental carbon monoxide at the inlet to the reaction section or to at least one reactor of said section results in a reduction in the $H_2/CO$ ratio of the feed and increases the total feed flow rate. Overall, the kinetic Fischer-Tropsch synthesis conditions are thus less favourable and this causes a reduction in the parameter $P_{H2O}{:}P_{H2}$. However, this option is generally not the most preferred option as it is difficult to carry out on an industrial scale. The availability of supplemental quantities of CO in effect necessitates action on the synthesis gas production unit with modification of the $H_2/CO$ ratio at the outlet from that unit;

iii) adding supplemental hydrogen ($H_2$) to the inlet to the synthesis reaction section or to at least one reactor is generally easier to carry out on an industrial scale using a supplemental stream of hydrogen available on-site. This addition leads to an increase in the $H_2/CO$ ratio in the feed to the Fischer-Tropsch reaction step. This supplemental excess hydrogen causes a reduction in the parameter $P_{H2O}:P_{H2}$. However, this option suffers from the disadvantage of modifying the intrinsic selectivity of the Fischer-Tropsch reaction due to the excess supplemental hydrogen in the feed. This modification leads to the greater formation of unwanted light products, in particular $C_2$-$C_4$ hydrocarbons and methane. This means is thus not a preferred means in accordance with the invention;

iv) this modification of the inlet $H_2/CO$ ratio may also occasionally be obtained by modifying the internal recycle conditions as detailed in 5).

8) Reducing the temperature results in slowing down the reaction kinetics in accordance with Arrhenius' law. As a consequence, the reduction in temperature causes a reduction in the CO conversion ratio and thus a reduction in the ratio $P_{H2O}:P_{H2}$.

9) Reducing the total pressure in the reaction section will also have an impact on the reaction kinetics and result in a reduction in the ratio $P_{H2O}:P_{H2}$ by reducing the degree of CO conversion.

Selecting at least one of these means selected from 4) to 9) described above essentially depends on the means which are available in the industrial unit and the operating conditions at the time.

Highly preferred means used in said step f) for optional adjustment of the ratio $P_{H2O}:P_{H2}$ are generally as follows: 4) increasing the feed flow rate; 5) in the case in which the reaction section or at least one reactor of said section is equipped with a recycle for unconverted gas, increasing the recycle ratio; and 6) continuously eliminating all or part of the water formed by the reaction. In certain cases, in particular after an incident on one unit such as an unforeseen reduction in the operating temperatures, for example, other means are preferably used in step f) for adjustment of the ratio $P_{H2O}:P_{H2}$, in particular a reduction of the operating temperature and modification of the $H_2/CO$ ratio at the inlet to the Fischer-Tropsch synthesis reaction section. In such cases, means 7) and 8) are generally easier to implement.

After carrying out said step f), the new theoretical value for the ratio $P_{H2O}:P_{H2}$ is determined afresh in accordance with said step g) of said first implementation of the method of the invention in order to check that at the end of said step g), said ratio $P_{H2O}:P_{H2}$ has a value of 0.8 or lower, preferably 0.75 or lower and highly preferably 0.7 or lower.

In accordance with a second preferred implementation of the optimization method of the invention, the essential parameter for control and optimization of the Fischer-Tropsch synthesis consisting of the application of a minimum value for the partial pressure of CO in the reaction section is associated with a supplemental parameter for control and optimization of the Fischer-Tropsch synthesis consisting of maintaining the partial pressure of water in the reaction section above a critical value $PpH_2O_{limit}$ defined by the following formula [1]:

$$PpH_2O_{limit} = \exp(-7751/d_p \cdot T) \cdot P_s(T) \quad [1]$$

where T is the reaction temperature in K;

$d_p$ is the mean pore diameter of the catalyst in nm, determined by adsorption-desorption of nitrogen (BJH method, Barrett, Joymer and Halenda, The Journal of the American Society 73, 373, (1951));

$P_s(T)$ is the saturated vapour pressure of water at temperature T, in bar.

Preferably, the partial pressure of water in the reaction section is checked and maintained above a value of 0.95 $PpH_2O_{limit}$. More preferably, this is checked and maintained above the value 0.9 $PpH_2O_{limit}$ and more preferably above a value of 0.8 $PpH_2O_{limit}$.

The partial pressure of water in the reaction section is preferably strictly lower than the partial pressure of hydrogen. More preferably, the partial pressure of water in the reaction section is 0.8 times or lower than the partial pressure of hydrogen and still more preferably 0.7 times or lower than the partial pressure of hydrogen. Under these conditions, the performance of the process is optimized, in particular in terms of catalyst stability.

The temperature T (in Kelvin) in formula [1] is that of the reaction section. When the reaction section comprises a plurality of reactors operating at different temperatures, control of the partial pressure of water is carried out reactor by reactor. Said temperature is generally in the range 100° C. to 500° C., more preferably in the range 180° C. to 300° C.

The mean diameter of the pores, $d_p$, of the catalyst present in the reaction section or in at least one reactor of the reaction section is determined using the BJH method (Barrett, Joymer and Halenda, The Journal of the American Society 73, 373, (1951)) for nitrogen adsorption and desorption at 77K. It corresponds to the value of the ratio $4V/A$, V being the desorbed BJH volume and A the area of the BJH pores at desorption, said BJH method being well known to the skilled person.

For the catalysts used in the Fischer-Tropsch synthesis in the present invention, said mean diameter is in the range 0.1 to 100 nm, preferably in the range 1 to 50 nm (1 nm=$10^{-9}$ m).

The saturated vapour pressure of water $P_s(T)$ occurring in formula [1] is given by thermodynamic tables that are well known to the skilled person and is expressed in bar (1 bar=$10^5$ Pa).

The partial pressure of water, $Pp_{H2O}$, in the reaction section is determined, in accordance with the skilled person's definition, from the molar composition of the gas phase contained in the reaction section and the total pressure. The partial pressure of water is calculated from the formula:

$$Pp_{H2O} = (x_{H2O}/\Sigma x_i) \cdot P_T$$

where $X_{H2O}$ is the molar fraction of water in the gas phase in the reaction section;

$X_i$ is the molar fraction of the gaseous compound i, and $\Sigma x_i = 1$;

$P_T$ is the total pressure in the reaction section.

Generally, the molar composition of the gas phase is determined by gas chromatographic analysis of a sample removed from the outlet from the reaction section. Any other means known to the skilled person may be used to determine the composition of the gas phase. As an example, it may also be obtained by computation from databases for the Fischer-Tropsch reaction: the ratio $H_2/CO$, the degree of CO conversion and the product distribution. The computation is easy for a skilled person to carry out having a complete material balance to hand.

In accordance with said second preferred implementation of the optimization method of the invention, the partial pressure of water in the reaction section is controlled by carrying out at least the following steps:

i) determining the value $PpH_2O_{limit}$ defined in formula [1] given above under the reaction conditions, taking into account the temperature of the reaction section and the properties of the catalyst used in the Fischer-Tropsch synthesis (mean pore diameter);

j) measuring the partial pressure of water, comparison with the value $PpH_2O_{limit}$ and if necessary, adjusting said partial pressure in the Fischer-Tropsch synthesis reaction section ($PpH_2O_{react}$) so that $PpH_2O_{react} < PpH_2O_{limit}$.

Adjustment of the partial pressure of water in accordance with said step j) of said second preferred implementation of the optimization method of the invention may be carried out using any means that is known to the skilled person, in particular a means selected from the following means:
10. increasing the feed flow rate;
11. in the case in which the reaction section or at least one reactor of the reaction section is equipped with a recycle for unconverted gas, increasing the recycle ratio;
12. reducing the operating temperature;
13. reducing the total pressure;
14. introducing an inert diluent into the feed for the Fischer-Tropsch reaction section;
15. continuously eliminating all or part of the water formed by the reaction.

In more detail, adjustment of the partial pressure of water according to said step j) of said preferred second implementation of the optimization method of the invention may be carried out using at least one of the following means:
10. Increasing the flow rate of fresh feed constituted by synthesis gas is one of the preferred means. It can reduce the contact time for the feed with the catalyst, and thus reduce the degree of conversion of CO per pass, i.e. the degree of conversion of CO measured at the inlet and outlet for the reaction section, and as a consequence reduce the partial pressure of water. Further, increasing the flow rate of fresh feed has the advantage of increasing the productivity of the overall Fischer-Tropsch process.
11. Increasing the recycle ratio of unconverted synthesis gas, in the case in which the reaction section or a reactor of the reaction section is equipped with an internal recycle, constitutes one of the preferred modes of action for reducing the partial pressure of water in the reaction section. Said increase causes a reduction in the degree of conversion of CO per pass, and as a consequence a reduction in the partial pressure of water in the reaction section.
12. Reducing the operating temperature results in slowing down the reaction kinetics in accordance with Arrhenius' law, which is well known to the skilled person. The resulting reduction in temperature causes a reduction in the CO conversion ratio and thus a reduction in the partial pressure of water.
13. Reducing the total pressure has a direct effect on the partial pressures and in particular on the partial pressure of water. It also has an effect on the reaction kinetics which will also result in a reduction in the partial pressure of water by reducing the degree of CO conversion.
14. Introducing an inert diluent, for example nitrogen or methane, to the inlet to the reaction section results in less favourable kinetic conditions for Fischer-Tropsch synthesis than when the feed is free of diluent and as a consequence to a reduction in the partial pressure of water in the reaction section. However, this option is generally not the preferred option as it is difficult to carry out on an industrial scale (problem of availability of the inert diluent, for example).
15. Another method for reducing the partial pressure of water consists of continuously eliminating the water formed by the reaction using a separation device installed in the reaction section or in a recycle loop integrated into the Fischer-Tropsch synthesis process. Such separation may, for example, be carried out using a drum which can separate the aqueous phase and the organic phase in a recycle loop or using a membrane installed in said loop or in at least one synthesis reactor.

The selection of at least one of these means essentially depends on the means which are available in the industrial unit and the operating conditions at the time.

The preferred means used in said step j) for adjustment of the partial pressure of water in the reaction section are increasing the feed flow rate; in the case in which the reaction section or one of the reactors of the reaction section is equipped with an internal recycle for unconverted gas, increasing the recycle ratio for unconverted synthesis gas; and reducing the temperature. Highly preferably, the partial pressure of water is adjusted either by increasing the flow rate of the feed or by increasing the recycle ratio of the unconverted synthesis gas in the case in which the reaction section or one of the reactors of said section is equipped with an internal recycle.

Highly preferably, said first preferred implementation of the optimization method of the invention and said preferred second implementation of the optimization method of the invention are carried out in a cumulative manner so that conditions such as the partial pressure of carbon monoxide are used wherein it is 4 bar or higher in the reaction section, the ratio $P_{H2O}:P_{H2}$ has a value of 0.8 or lower and the partial pressure of water is maintained above a critical value $PpH_2O_{limit}$ defined above. Preferably, the operating conditions in the reaction section are such that the partial pressure of carbon monoxide is 4.5 bar or higher or even 4.8 bar or higher in the reaction section, the ratio $P_{H2O}:P_{H2}$ has a value of 0.8 or lower, preferably 0.75 or lower and more preferably 0.70 or less and the partial pressure of water is maintained above a critical value $PpH_2O_{limit}$ defined above, preferably maintained above the value 0.95 $PpH_2O_{limit}$, more preferably maintained above a value 0.9 $PpH_2O_{limit}$ and even more preferably above the value 0.8 $PpH_2O_{limit}$. In accordance with a particular implementation of the invention, the operating conditions in the reaction section are such that the partial pressure of carbon monoxide is 4.5 bar or higher, the ratio $P_{H2O}:P_{H2}$ has a value or 0.7 or lower and the partial pressure of water is maintained above the value 0.8 $PpH_2O_{limit}$. These conditions are obtained employing one or more of means 1) to 15) described above in the present invention.

The following examples illustrate the invention.

Example 1

Influence of the Partial Pressure of Carbon Monoxide on Catalyst Stability

The Fischer-Tropsch synthesis reaction was carried out in a reaction section comprising a continuously stirred reactor (CSTR) which could be maintained at pressure and temperature and which could be operated continuously. The reactor was supplied with a synthesis gas characterized by its $H_2/CO$ molar ratio, its quantity of inert compounds (% dilution, nitrogen being present as the inert compound). The flow rate of the feed formed by synthesis gas was checked and could also be adjusted to keep the CO conversion constant. The Fischer-Tropsch synthesis was carried out at 230° C. in the presence of a cobalt-based catalyst supported on stabilized alumina, which had been reduced. The catalytic performance was determined by gas chromatographic analysis of the feed and the gaseous effluent and by measuring the flow rates of the gas streams at the inlet and outlet of the reaction section. The activity of the catalyst was determined using the Sarup-Wojciechowski type kinetic equation (B Sarup, B W Wojciechowski, Can J Chem Eng (1989) vol 67, pp 62-74, I C Yates, C N Satterfield, Energy & Fuels (1991), vol 5, pp 168-173). More precisely, the activity of the catalyst was determined using the following equation:

$R_{CO} = a \cdot (P_{H2}^{0.5} \cdot P_{CO}^{0.5})/(1+b \cdot P_{CO}^{0.5})^{0.5}$, where a is the kinetic constant of the reaction and b is an adsorption coefficient, the values for a and b being peculiar to the catalyst employed.

Several experiments were carried out under different synthesis gas supply conditions and at different conversions:

Example 1.1 (Comparative)

the reaction was carried out at 230° C. at 20 bar, inert gas percentage 35% (vol %), $H_2$/CO (mol)=2.14; conversion was maintained at 60%;

Example 1.2 (Comparative)

the reaction was carried out at 230° C. at 20 bar, inert gas percentage 20% (vol %), $H_2$/CO (mol)=2.14; conversion was maintained at 60%;

Example 1.3 (Comparative)

the reaction was carried out at 230° C. at 20 bar, inert gas percentage 26% (vol %), $H_2$/CO (mol)=1.75; conversion was maintained at 50%;

Example 1.4 (Invention)

This example was implemented by initially repeating the operating conditions of Example 1.3 wherein the partial pressure of CO was lower than 4 bar. The partial pressure of CO was adjusted by increasing the total pressure in the reaction section to 30 bar. This increase in total pressure was carried out over a time considered to be negligible compared with the duration of the test (1000 hours). The percentage of inert compounds, namely nitrogen, in the feed (degree of dilution of the feed) was also increased. The partial pressure of CO was thus equal to 4.5 bar in the reaction section.

Example 1.5 (Invention)

This example was implemented by initially repeating the operating conditions of Example 1.3 wherein the partial pressure of CO was lower than 4 bar. The partial pressure of CO was adjusted by reducing the percentage of inert compounds, namely nitrogen, in the feed (degree of dilution of the feed reduced from 26% to 12% by volume). This dilution was carried out over a time considered to be negligible compared with the duration of the test (1000 hours). The other conditions were unchanged from those of Example 1.3. The partial pressure of CO was thus equal to 4.5 bar in the reaction section.

Example 1.6 (Invention)

This example was implemented by initially repeating the operating conditions of Example 1.3 wherein the partial pressure of CO was lower than 4 bar. The partial pressure of CO was adjusted by increasing the total pressure to 28 bar. This increase in total pressure was carried out over a time considered to be negligible compared with the duration of the test (1000 hours). The other conditions were unchanged from those of Example 1.3. The partial pressure of CO was thus equal to 5 bar in the reaction section.

Example 1.7 (Invention)

This example was implemented by initially repeating the operating conditions of Example 1.3 wherein the partial pressure of CO was lower than 4 bar. The partial pressure of CO was adjusted by increasing the total pressure to 28 bar in the reaction section, removing nitrogen from the feed (degree of dilution zero) and as a consequence substantially increasing the volume flow rate of the feed (by a factor of approximately 2.8) in order to reduce the percentage conversion to 20%. These changes were carried out over a time considered to be negligible compared with the duration of the test (1000 hours). The partial pressure of CO was thus equal to 9.4 bar in the reaction section.

Table 1 below summarizes the data concerning Examples 1.1 to 1.7 and indicates the partial pressure of CO in the reaction section as well as the activity of the catalyst measured for each of these examples.

TABLE 1

| | Examples | | | | | | |
|---|---|---|---|---|---|---|---|
| | 1.1 | 1.2 | 1.3 | 1.4 | 1.5 | 1.6 | 1.7 |
| T (° C.) | 230 | 230 | 230 | 230 | 230 | 230 | 230 |
| Total P in reactor (bar) | 20 | 20 | 20 | 30 | 20 | 28 | 28 |
| $H_2$/CO in feed (mol) | 2.14 | 2.14 | 1.75 | 1.75 | 1.75 | 1.75 | 1.75 |
| Inerts in feed (vol %) | 35 | 20 | 26 | 35 | 12 | 26 | 0 |
| CO conversion during test (%) | 60 | 60 | 50 | 50 | 50 | 50 | 20 |
| PpCO in reactor (bar) | 2.1 | 2.8 | 3.5 | 4.5 | 4.5 | 5.0 | 9.4 |
| Measured activity (% arbitrary units): | | | | | | | |
| Initial (time = 100 h) | 100 | 100 | 100 | 100 | 100 | 100 | 100 |
| After 1000 h | 75 | 89 | 95 | 98 | 98 | 98 | 98.5 |
| Residual activity after 1000 h (%) | 75 | 89 | 95 | 98 | 98 | 98 | 98.5 |

A comparison of Examples 1.1 to 1.7 shows that the best performances in terms of activity of the catalyst were obtained when the partial pressure of CO was higher than 4 bar. Since the residual activity was substantially improved when the partial pressure of CO was higher than 4 bar, this resulted in much better stability of the catalyst used under the conditions of the invention. The optimization method of the invention thus produces an improved service life for the Fischer-Tropsch catalyst, and hence a reduction in catalyst replacement frequency.

Example 2

Influence of the Partial Pressure of CO, Partial Pressure of Water and the Ratio $P_{H2O}:P_{H2}$ on Catalyst Stability The Fischer-Tropsch synthesis reaction was carried out in a reaction section comprising a continuously stirred reactor (CSTR) which could be maintained at pressure and temperature and which could be operated continuously. The reactor was supplied with a synthesis gas characterized by its $H_2/CO$ molar ratio and its quantity of inert compounds (% dilution, nitrogen being present as the inert compound). The flow rate of the feed formed by synthesis gas was checked and could also be adjusted to keep the CO conversion constant. The Fischer-Tropsch synthesis was carried out at 230° C. in the presence of a cobalt-based catalyst supported on stabilized alumina, which had been reduced.

The catalytic performance was determined by gas chromatographic analysis of the feed and the gaseous effluent and by measuring the flow rates of the gas streams at the inlet and outlet of the reaction section. The activity of the catalyst was determined using the Sarup-Wojciechowski type kinetic equation (B Sarup, B W Wojciechowski, Can J Chem Eng (1989) vol 67, pp 62-74, I C Yates, C N Satterfield, Energy & Fuels (1991), vol 5, pp 168-173). More precisely, the activity of the catalyst was determined using the following equation:
$R_{CO}=a \cdot (P_{H2}^{0.5} \cdot P_{CO}^{0.5})/(1+b \cdot P_{CO}^{0.5})^{0.5}$, where a is the kinetic constant of the reaction and b is an adsorption coefficient, the values for a and b being peculiar to the catalyst employed.

Several experiments were carried out under different synthesis gas supply conditions and at different conversions:

Example 2.1 (Comparative)

the reaction was carried out at 230° C. at 20 bar, inert gas percentage 20% (vol %), $H_2/CO$ (mol)=2.14; conversion was maintained at 60%;

Example 2.2 (Comparative)

the reaction was carried out at 230° C. at 20 bar, inert gas percentage 26% (vol %), $H_2/CO$ (mol)=1.75; conversion was maintained at 55%;

Example 2.3 (Comparative)

the reaction was carried out at 230° C. at 20 bar, inert gas percentage 26% (vol %), $H_2/CO$ (mol)=1.75; conversion was maintained at 50%;

Example 2.4 (Comparative)

the reaction was carried out at 230° C. at 30 bar, inert gas percentage 26% (vol %), $H_2/CO$ (mol)=1.75; conversion was maintained at 60%;

Example 2.5 (Invention)

This example was implemented by initially repeating the operating conditions of Example 2.3 wherein the partial pressure of CO was lower than 4 bar. The partial pressure of CO was adjusted by increasing the total pressure in the reaction section to 30 bar and the percentage of inert compounds was increased so that the partial pressure of water was above $PpH_2O_{limit}$ (equal to 6 bar). The other conditions were unchanged from those of Example 2.3. The partial pressure of CO in the reaction section was thus equal to 4.5 bar and the partial pressure of water was equal to 4.4 bar.

The critical value of $PpH_2O_{limit}$ was calculated from the following data: T=503K; Dp=10 nm; Ps(503K)=28 bar. Computation of $PpH_2O_{limit}$ using formula [1] given above in the present description $(PpH_2O_{limit}=\exp(-7751/d_p \cdot T) \cdot P_s(T))$ produced a value of 6 bar.

Table 2 below summarizes the data concerning Examples 2.1 to 2.5 and indicates the partial pressure of CO, the partial pressure of water and the ratio $Pp_{H2O}:Pp_{H2}$ in the reaction section as well as the activity of the catalyst measured for each of these examples.

TABLE 2

| | Example | | | | |
|---|---|---|---|---|---|
| | 2.1 | 2.2 | 2.3 | 2.4 | 2.5 |
| T (° C.) | 230 | 230 | 230 | 230 | 230 |
| Total P in reactor (bar) | 20 | 20 | 20 | 30 | 30 |
| $H_2/CO$ in feed (mol) | 2.14 | 1.75 | 1.75 | 1.75 | 1.75 |
| Inerts in feed (vol %) | 20 | 26 | 26 | 26 | 35 |
| CO conversion during test (%) | 60 | 55 | 50 | 60 | 50 |
| PpCO in reactor (bar) | 2.8 | 3.3 | 3.5 | 4.6 | 4.5 |
| PpH2O in reactor (bar) | 4.1 | 3.9 | 3.5 | 6.7 | 4.4 |
| PpH2O/PpH2 | 0.7 | 0.9 | 0.7 | 1.2 | 0.7 |
| Measured activity (% arbitrary units): | | | | | |
| Initial (time = 100 h) | 100 | 100 | 100 | 100 | 100 |
| After 1000 h | 89 | 82 | 95 | 75 | 98 |
| Residual activity after 1000 h (%) | 89 | 82 | 95 | 75 | 98 |

A comparison of Examples 2.1 to 2.5 shows that the best performances in terms of stability of the catalyst were obtained when the partial pressure of CO was higher than 4 bar, the partial pressure of water was lower than a critical value $PpH_2O_{limit}$ equal to 6 bar in the present case, and the ratio $Pp_{H2O}:Pp_{H2}$ was 0.7 or lower.

The invention claimed is:

1. A method for optimizing the operation of a reaction section synthesizing hydrocarbons from a feed comprising synthesis gas, which is operated in the presence of a catalyst comprising cobalt, said method comprising synthesizing said hydrocarbons, in a three-phase reactor in which catalyst is suspended in an essentially inert liquid phase and in a reactive gas phase comprising the feed:
 a) determining the theoretical partial pressure of CO in the reaction section;
 b) adjusting the partial pressure of CO determined in step a) to a value of 4 bar or higher by at least one of 1, 2 or 3:
  1) increasing the total pressure in said reaction section;
  2) increasing the concentration of CO in the feed by employing one and/or the other of 2.1) or 2.2):
   2.1) reducing the inert compounds in the feed;
   2.2) reducing the $H_2/CO$ molar ratio in the feed;
  3) reducing the degree of CO conversion;
 c) determining a new value for the theoretical partial pressure of CO in the reaction section to ensure that the theoretical partial pressure reaches a value of 4 bar or higher.

2. A method according to claim 1, in which the theoretical partial pressure of CO at the end of c) is 4.5 bar or higher.

3. A method according to claim 1, in which the theoretical partial pressure of CO at the end of c) is 4.8 bar or higher.

4. A method according to claim 1, in which the adjustment of the partial pressure of CO in accordance with b) is carried out by increasing the total pressure in the Fischer-Tropsch synthesis reaction section or by reducing the inert compounds in the feed in order to increase the concentration of CO in the feed.

5. A method according to claim 1, in which the theoretical partial pressure of CO is determined in accordance with a) from the molar composition of the gas phase in said reaction section and from the total pressure within said reaction section.

6. A method according to claim 1, which comprises the following controls:
   e) determining the theoretical molar ratio, $P_{H2O}$:$H_{H2}$, in the reaction section;
   f) optionally, adjusting the ratio $P_{H2O}$:$P_{H2}$ determined in e) to a value of 0.8 or lower;
   g) determining the new value for the theoretical ratio $P_{H2O}$:$P_{H2}$ in the reaction section to check that said ratio has a value of 0.8 or lower.

7. A method according to claim 6, in which the optional adjustment of the ratio $P_{H2O}$:$P_{H2}$ in f) is carried out using at least one of:
   4) increasing the feed flow rate;
   5) in the case in which the reaction section or at least one reactor of the reaction section is equipped with a recycle for unconverted synthesis gas, increasing the recycle ratio;
   6) continuously eliminating all or part of the water formed by the Fischer-Tropsch synthesis reaction;
   7) modifying the ratio $H_2$/CO at the inlet to the reaction section for hydrocarbon synthesis or at least one reactor of said section when there is a plurality;
   8) reducing the operating temperature; or
   9) reducing the total pressure.

8. A method according to claim 6, in which at the end of g), the new value of the ratio of the partial pressure of water and of hydrogen, $P_{H2O}$:$P_{H2}$, has a value of 0.7 or lower.

9. A method according to claim 6, in which the partial pressure of water in said reaction section is controlled in order to maintain it above a critical value $PpH_2O_{limit}$ defined by the following formula [1]:

$$PpH_2O_{limit} = \exp(-7751/d_p \cdot T) \cdot P_s(T) \qquad [1]$$

where T is the reaction temperature in K;
$d_p$ is the mean pore diameter of the catalyst in nm, determined by nitrogen adsorption-desorption; $P_s(T)$ is the saturated vapor pressure of water at the temperature T, in bar.

10. A method according to claim 9, in which the partial pressure of water is controlled by carrying out at least the following:
   i) determining the value $PpH_2O_{limit}$ defined in formula [1] under the reaction conditions;
   j) measuring the partial pressure of water, comparison with the value $PpH_2O_{limit}$ and optionally adjusting said partial pressure in the Fischer-Tropsch synthesis reaction section ($PpH_2O_{react}$) so that $PpH_2O_{react} < PpH_2O_{limit}$, said adjustment being carried out by at least one of:
   10) increasing the feed flow rate;
   11) in the case in which the reaction section or one of the reactors of the reaction section is equipped with a recycle for unconverted gas, increasing the recycle ratio;
   12) reducing the operating temperature;
   13) reducing the total pressure;
   14) introducing an inert diluent into the feed for the Fischer-Tropsch reaction section;
   15) continuously eliminating all or part of the water formed by the reaction.

11. A method according to claim 9, in which the partial pressure of water in said reaction section is maintained above the value 0.8 $PpH_2O_{limit}$.

12. A method according to claim 9, in which the partial pressure of water in the reaction section is strictly lower than the partial pressure of hydrogen.

13. A method according to claim 9, operated under conditions such that the partial pressure of carbon monoxide is 4 bar or higher in the reaction section, the ratio $P_{H2O}$:$P_{H2}$ has a value of 0.8 or lower and the partial pressure of water is maintained beyond a critical value $PpH_2O_{limit}$ defined from said formula [1].

* * * * *